(12) United States Patent
Kim et al.

(10) Patent No.: US 8,503,317 B2
(45) Date of Patent: Aug. 6, 2013

(54) METHOD OF CONTROLLING NETWORK IN WIRELESS NETWORK AND DEVICE

(75) Inventors: Joong Heon Kim, Seoul (KR); Beom Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 554 days.

(21) Appl. No.: 12/797,007

(22) Filed: Jun. 9, 2010

(65) Prior Publication Data

US 2010/0309818 A1  Dec. 9, 2010

Related U.S. Application Data

(60) Provisional application No. 61/185,205, filed on Jun. 9, 2009.

(30) Foreign Application Priority Data

Dec. 18, 2009  (KR) .................. 10-2009-0126919

(51) Int. Cl.
*H04W 84/18*  (2009.01)

(52) U.S. Cl.
USPC .......................................... 370/252; 370/401

(58) Field of Classification Search
None
See application file for complete search history.

(56) References Cited

U.S. PATENT DOCUMENTS

| | | | |
|---|---|---|---|
| 2006/0056345 A1* | 3/2006 | Marinier et al. | 370/329 |
| 2006/0176908 A1* | 8/2006 | Kwon et al. | 370/473 |
| 2006/0268760 A1* | 11/2006 | Fang et al. | 370/328 |
| 2007/0270121 A1 | 11/2007 | Shao et al. | 455/403 |
| 2007/0286140 A1* | 12/2007 | Kwon | 370/338 |
| 2008/0095072 A1* | 4/2008 | Shao et al. | 370/254 |
| 2008/0129879 A1* | 6/2008 | Shao et al. | 348/723 |
| 2008/0250294 A1* | 10/2008 | Ngo et al. | 714/752 |
| 2009/0109938 A1* | 4/2009 | Singh et al. | 370/337 |
| 2009/0160707 A1* | 6/2009 | Lakkis | 342/367 |
| 2010/0159845 A1* | 6/2010 | Kaaja et al. | 455/70 |
| 2010/0278127 A1* | 11/2010 | Jeon et al. | 370/329 |
| 2011/0199918 A1* | 8/2011 | Sampath et al. | 370/252 |

FOREIGN PATENT DOCUMENTS

| KR | 10-0678932 B1 | 2/2007 |
|---|---|---|
| KR | 10-2008-0114655 A | 12/2008 |

OTHER PUBLICATIONS

Ergen, Sinem Coleri; "ZigBee/IEEE 802.15.4 Summary"; http://www.sinemergen.com/zigbee.pdf; pp. 1-35; Sep. 10, 2004.
PCT International Search Report and Written Opinion dated Jan. 26, 2011 issued in Application No. PCT/KR2010/003683.

* cited by examiner

*Primary Examiner* — Hassan Phillips
*Assistant Examiner* — Duc Duong
(74) *Attorney, Agent, or Firm* — KED & Associates LLP

(57) ABSTRACT

A method of controlling a network at a coordinator of a wireless network comprises receiving a beacon, which includes at least one of transmission coverage information associated with signal transmission coverage of the wireless network and ACK packet information indicating a type of an ACK packet transmitted from a plurality of devices for acknowledgement during reception of data packets, from a coordinator of the wireless network; receiving the data packets from a transmitting device of the wireless network; and transmitting an ACK packet having an ACK packet type determined based on the ACK packet type information included in the beacon to the transmitting device as a signal for acknowledgement of the data packets.

18 Claims, 15 Drawing Sheets

FIG. 18

| Octets: 1 | 1 | 1 | ... | 1 |
|---|---|---|---|---|
| Command ID | Length | IE index 1 | ... | IE index 7 |
| 100 | 101 | \multicolumn{3}{c}{102} | |

FIG. 19

| Octets: 1 | 1 | Variable | ... | Variable |
|---|---|---|---|---|
| Command ID | Length | IE 1 | ... | IE 7 |
| 110 | 111 | \multicolumn{3}{c}{112} | |

METHOD OF CONTROLLING NETWORK IN WIRELESS NETWORK AND DEVICE

Pursuant to 35 U.S.C. §119(e), this application claims the benefit of priority to Provisional Application No. 61/185,205, filed on Jun. 9, 2009, and Korean patent application No. 10-2009-0126919 filed on Dec. 18, 2009, the contents of which are incorporated by reference herein in their entirety.

BACKGROUND OF THE INVENTION

1. Field of the Invention

The present invention relates to a wireless communication system, and more particularly, to a method and device of controlling a wireless network adaptively to a wireless environment.

2. Discussion of the Related Art

Recently, Bluetooth and wireless personal area network (WPAN) technologies have been developed, which form a wireless network between a relatively small number of digital devices in limited places such as homes or small companies to allow audio or video data to be exchanged between the devices. The WPAN can be used for information exchange between a relatively small number of digital devices in a relatively close distance, and enables low power and low-cost communication between the digital devices. IEEE 802.15.3 (Wireless Medium Access Control (MAC) and Physical Layer (PHY) Specifications for High Rate Wireless Personal Area Networks (WPANs)) approved on Jun. 12, 2003 defines specification of a MAC layer and a physical (PHY) layer of high rate WPAN.

FIG. 1 is a brief diagram illustrating an example of a wireless private access network (WPAN).

As illustrated in FIG. 1, the WVAN is a network configured between personal devices within a limited space such as home, and allows information to be exchanged between applications without seamlessness by configuring a network through direct communication between devices. Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

The WPAN is not predesigned but is an ad hoc network (hereinafter, referred to as 'piconet') formed if necessary without assistance of a central infrastructure. A procedure of forming one piconet will be described in detail. The piconet starts as a random device that can be operated as a coordinator performs the function of the coordinator. All devices perform scanning before associating with the existing piconet or starting a new piconet. Scanning means that a device collects and stores information of channels and searches whether the existing piconet exists. A device that has been commanded from an upper layer to start a piconet forms a new piconet without associating with a piconet previously formed on a random channel. The device starts a piconet by selecting a channel having little interference based on data acquired during scanning and broadcasting a beacon through the selected channel. In this case, the beacon means timing allocation information, information of other devices within a piconet, and control information broadcasted by the coordinator to control and manage the piconet.

FIG. 2 is a diagram illustrating an example of a superframe used in a piconet. Timing control in the piconet is basically performed based on superframes. Referring to FIG. 2, each superframe starts by means of the beacon transmitted from the coordinator. A contention access period (CAP) is used to allow devices to transmit commands or asynchronous data based on contention. A channel time allocation period includes a management channel time block (MCTB) and a channel time block (CTB). The MCTB is a period where control information can be transmitted between a coordinator and a device or between devices. The CTB is a period where asynchronous data or isochronous data can be transmitted between a device and a coordinator or between other devices. For each superframe, the number, length and location of CAPs, MCTBs, and CTBs are determined by the coordinator and transmitted to other devices within the piconet through the beacon.

When a random device within the piconet needs to transmit data to the coordinator or other device, the device requests the coordinator to allocate channel resources for data transmission, and the coordinator allocates the channel resources to the device within the range of available channel resources. If the CAP exists within the superframe and the coordinator accepts data transmission in the CAP, the device can transmit data of small capacity through the CAP without being allocated with channel time from the coordinator.

If the number of devices within the piconet is small, since channel resources for data transmission from each device are sufficient, no problem occurs in allocation of channel resources. However, if channel resources are insufficient due to a large number of devices, or if data of large capacity such as moving pictures are transmitted, a problem may occur in that channel resources are not allocated to the other devices even though the other devices have data to be transmitted, whereby communication cannot be performed.

Also, during data communication between two or more devices that belong to the WVAN, communication quality may be deteriorated depending on the statuses of the devices, such as an obstacle occurring between the devices and interfering with communication, change of the distance or location between the devices, and interference caused by another neighboring device.

In this respect, various methods for efficiently performing data communication between devices constituting WVAN without any problem are being studied.

SUMMARY OF THE INVENTION

In a wireless communication system, it is important that a receiving rate and accuracy are improved to receive data without loss during data transmission. Acknowledgement of data transmission is performed in such a manner that a random device transmits data to another device and receives an ACK/NACK signal of the data.

In respect of the data receiving rate, devices which belong to the wireless communication system may be affected by the peripheral environment. For example, even though data transmission between a transmitting device and a receiving device has been successfully performed, if the transmitting device departs from a signal transmission available range of the receiving device, the ACK signal of the data is not transmitted to the transmitting device. As a result, it is determined that the transmitting device fails in data transmission.

Accordingly, the present invention is directed to a method and device of controlling a wireless network, which substantially obviates ones or more problems due to limitations and disadvantages of the related art.

An object of the present invention is to provide a method of controlling a wireless network adaptively to a wireless environment of a device, which belongs to the wireless network, so as to perform optimized wireless communication.

Another object of the present invention is to provide a method of controlling a plurality of devices, which belong to the same network, by controlling a coordinator that belongs to a wireless network.

Other object of the present invention is to provide a method of setting a parameter that can allow a user to control a network adaptively to a wireless environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a network at a receiving device of a wireless network comprises receiving a beacon, which includes at least one of transmission coverage information associated with signal transmission coverage of the wireless network and ACK packet information indicating a type of an ACK packet transmitted from a plurality of devices for acknowledgement during reception of data packets, from a coordinator of the wireless network; receiving the data packets from a transmitting device of the wireless network; and transmitting an ACK packet having an ACK packet type determined based on the ACK packet type information included in the beacon to the transmitting device as a signal for acknowledgement of the data packets.

Preferably, at least one of the transmission coverage information and the ACK packet type information associated with configuration of the wireless network are input through a user interface of the coordinator of the wireless network.

The method further comprises receiving location information where the wireless network is implemented in respect of the signal transmission coverage of the wireless network from the coordinator through the beacon, wherein the location information is input through the user interface.

The transmission coverage information is determined by a user input for a maximum distance among distances between the respective devices belonging to the wireless network.

The ACK packet type is determined by a user input for a transmission direction of the ACK packet, and the ACK packet type is a directional ACK packet or an omni-directional ACK packet.

At least one of the transmission coverage information and the ACK packet type information is broadcasted through the beacon by being included in a vendor specific information element (IE), and a data format of the vendor specific IE includes an information element index field that includes index information indicating that an information element broadcasted by the coordinator is the vendor specific information element, a vendor organizationally unique identifier (OUI) field that includes unique identification information of a vendor, and a vendor specific parameter field that includes at least one parameter information associated with a property of the vendor.

In this case, the vendor specific parameter field includes at least one of a field that includes transmission coverage information associated with the signal transmission coverage and a field that includes ACK packet type information indicating a type of ACK packet transmitted from the plurality of devices for acknowledgement of data packets during reception of the data packets.

The ACK packet type is determined by the signal transmission coverage.

The method further comprises controlling a transmission power used for transmission of the ACK packet and other packets in accordance with the transmission coverage information.

In this case, the plurality of devices transmit and receive signals by using a superframe that includes a field to which a beacon is transmitted, at least one reserved channel time block field where data packets between a specific device and another device and ACK packet for acknowledgement of the data packets are transmitted and received in accordance with allocation of channel resources from the coordinator to the specific device, and at least one unreserved channel time block where the coordinator does not allocate channel resources to any device.

In another aspect of the present invention, a receiving device of a wireless network comprises a transmitting module for transmission of a wireless signal; a receiving module receiving a beacon, which includes at least one of transmission coverage information associated with signal transmission coverage of the wireless network and ACK packet information indicating a type of an ACK packet transmitted from a plurality of devices for acknowledgement during reception of data packets, from a coordinator of the wireless network and receiving the data packets from a transmitting device of the wireless network; and a control module transmitting an ACK packet having an ACK packet type determined based on the ACK packet type information to the transmitting device through the transmitting module for acknowledgement of the data packets.

Preferably, at least one of the transmission coverage information associated with the signal transmission coverage of the wireless network and the ACK packet type information is input through a user interface of the coordinator of the wireless network.

The receiving module receives location information where the wireless network is implemented in respect of the signal transmission coverage of the wireless network from the coordinator through the beacon, and the location information is input through the user interface.

The control module controls a transmission power used for transmission of the ACK packet and other packets in accordance with the transmission coverage information.

In other aspect of the present invention, a method of transmitting data from a transmitting device of a wireless network comprises transmitting a channel resource allocation request command to a coordinator of the wireless network to request the coordinator to allocate a channel resource of a certain amount; being allocated with the channel resource of a certain amount from the coordinator; transmitting at least one or more data packets to a receiving device through the allocated channel resource; and receiving an ACK packet for acknowledgment of the data packets from the receiving device.

The method further comprises receiving a response message, which includes channel resource allocation information indicating whether the channel resource has been allocated, in response to the channel resource allocation request command.

The aforementioned embodiments are only a part of the preferred embodiments of the present invention, and various embodiments on which technical features of the present invention are reflected can be devised and understood by the person with ordinary skill in the art based on the detailed description of the present invention, which will be described later.

According to the embodiment of the present invention, it is possible to control a wireless network adaptively to a wireless environment of a device, which belongs to the wireless network, so as to perform optimized wireless communication.

Also, it is possible to control a plurality devices, which belong to the same network, by controlling a coordinator that belongs to the wireless network.

Moreover, the user can control the network adaptively to a wireless environment in respect of configuration of the wireless network environment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 18 is a diagram illustrating an example of a probe request command format transmitted from a WVAN device according to one embodiment of the present invention;

FIG. 19 is a diagram illustrating an example of a probe response command format transmitted from a WVAN coordinator according to one embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be understood readily by the preferred embodiments of the present invention, examples of which are illustrated in the accompanying drawings. Embodiments described later are examples in which technical features of the present invention are applied to a wireless video area network (WVAN) which is a kind of a WPAN.

Figure 1:
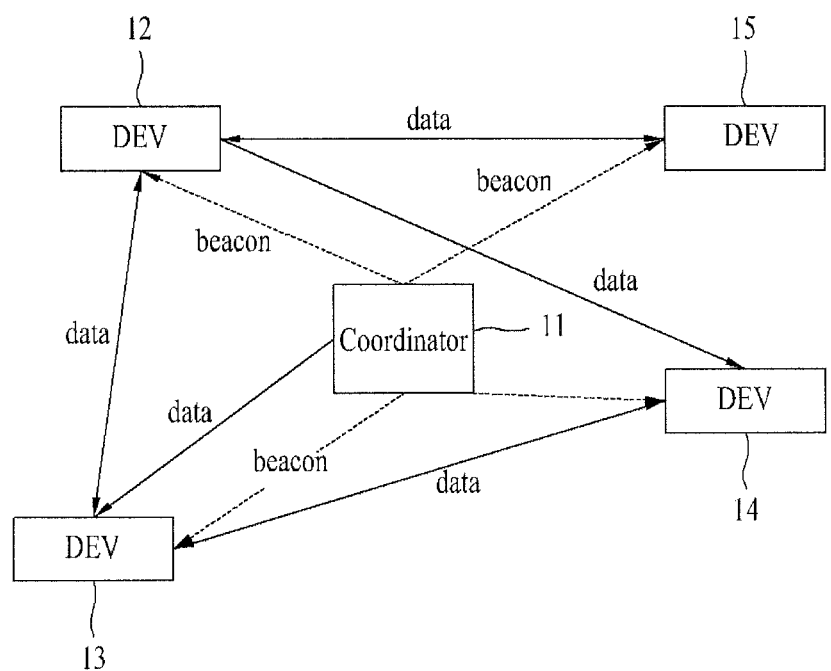
FIG. 1 is a diagram illustrating an example of a WPAN.
Figure 2:
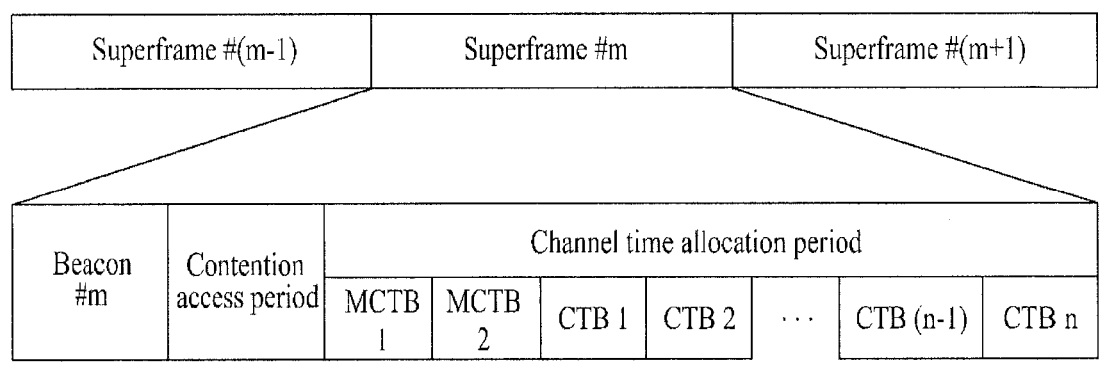
FIG. 2 is a diagram illustrating an example of a superframe used in a piconet.
Figure 3:
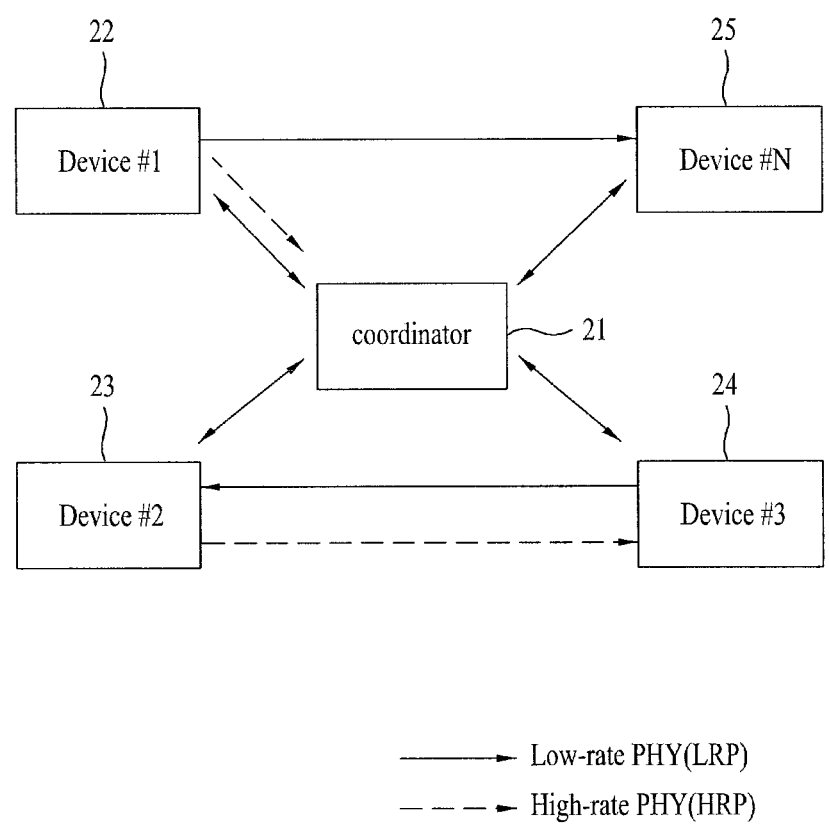
FIG. 3 is a diagram illustrating an example of a WVAN.

FIG. 3 is a diagram illustrating an example of a WVAN. In the same manner as illustrated in FIG. 1, a WVAN of FIG. 3 includes two or more user devices 22 to 25, one of which acts as a coordinator 21. The coordinator 21 provides basic timing of the WVAN, maintains a track of devices belonging to the WVAN, and serves to control quality of service (QoS) requirements. The coordinator performs its function and at the same time serves as one device belonging to the WVAN. Other devices 22 to 25 different from the coordinator 21 can start stream connection.

One of the differences between the WVAN illustrated in FIG. 3 and the WPAN of FIG. 1 is that the WVAN of FIG. 3 supports two kinds of physical (PHY) layers. Namely, the WVAN supports physical layers, high-rate physical (HRP) layer and low-rate physical (LRP) layer. The HRP layer is a physical layer that can support a data transmission rate of 1 Gb/s or greater, and the LRP layer is a physical layer that supports a data transmission rate of several Mb/s. The HRP layer is highly directional, and is used for transmission of isochronous data streams, asynchronous data, MAC command and A/V control data through unicast connection. The LRP layer supports a directional or omni-directional mode and is used for transmission of beacon, asynchronous data, MAC command through unitcast or broadcasting. The coordinator 21 can transmit or receive data to and from other device using the HRP and/or LRP layer. The other devices 22 to 25 of the WVAN can also transmit or receive data using the HRP and/or LRP layer. The A/V data mean that data transmitted and received include at least one of audio data and video data.

Figure 4:
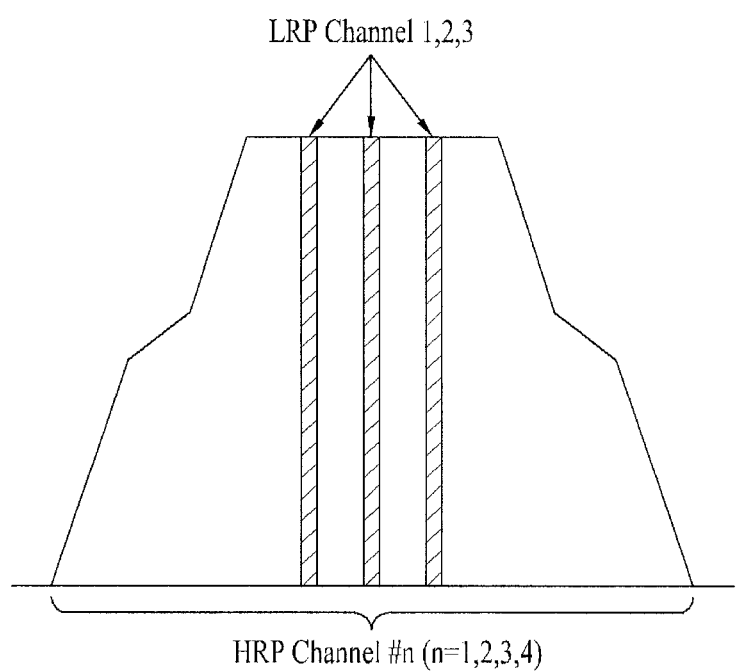
FIG. 4 is a diagram illustrating a frequency band of HRP channels and LRP channels used in a WVAN.

FIG. 4 is a diagram illustrating a frequency band of HRP channels and LRP channels used in a WVAN. The HRP layer uses four channels of a bandwidth of 2.0 GHz in a band of 57 to 66 GHz, and the LRP layer uses three channels of a bandwidth of 92 MHz. As illustrated in FIG. 4, the HRP channels and the LRP channels share a frequency band and are used respectively by a TDMA mode.

Figure 5:
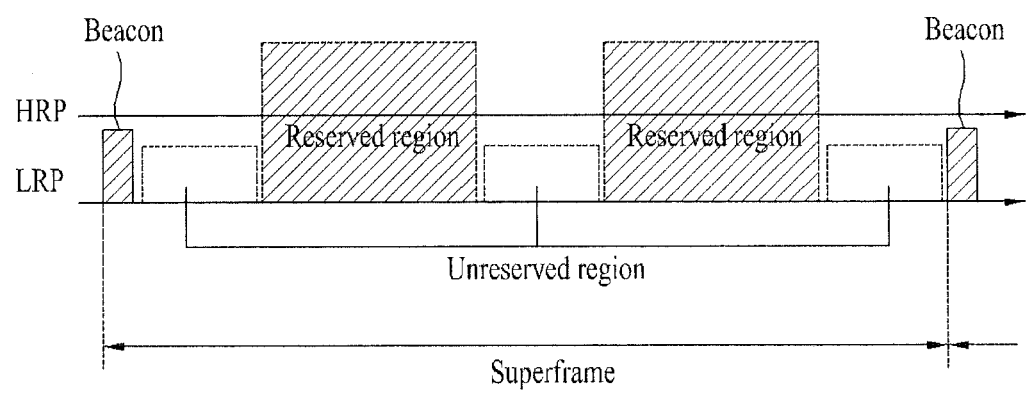
FIG. 5 is a diagram illustrating an example of a structure of a superframe used in a WVAN.

FIG. 5 is a diagram illustrating an example of a structure of a superframe used in a WVAN. Referring to FIG. 5, each superframe includes a beacon region where a beacon is transmitted, a reserved region allocated to a random device by the coordinator in accordance with a request of the devices, and an unreserved region not allocated by the coordinator but transmitting and receiving data between the coordinator and device or between devices in accordance with a contention based mode, wherein each of the regions is time divided. The beacon includes timing allocation information in a corresponding superframe, and management and control information of the WVAN. The reserved region is used to transmit data from a device, to which channel time is allocated by the coordinator in accordance with a channel time allocation request of the device, to other device. Command, data streams, asynchronous data, etc. can be transmitted through the reserved region. If a specific device transmits data to other device through the reserved region, the HRP channel is used. If the device that receives the data transmits ACK/NACK signal of the received data, the LRP channel is used. The unreserved region can be used to transmit control information, MAC command, or asynchronous data between the coordinator and the device or between the devices. In order to prevent data collision between the devices in the unreserved region, a carrier sense multiple access (CSMA) mode or a slotted Aloha mode can be used. In the unreserved region, the data can be transmitted through the LRP channel only. If there are many kinds of control information or commands to be transmitted, the reserved region can be set in the LRP channel. In each superframe, the length and the number of reserved regions and unreserved regions can be varied per superframe and are controlled by the coordinator.

Figure 6:
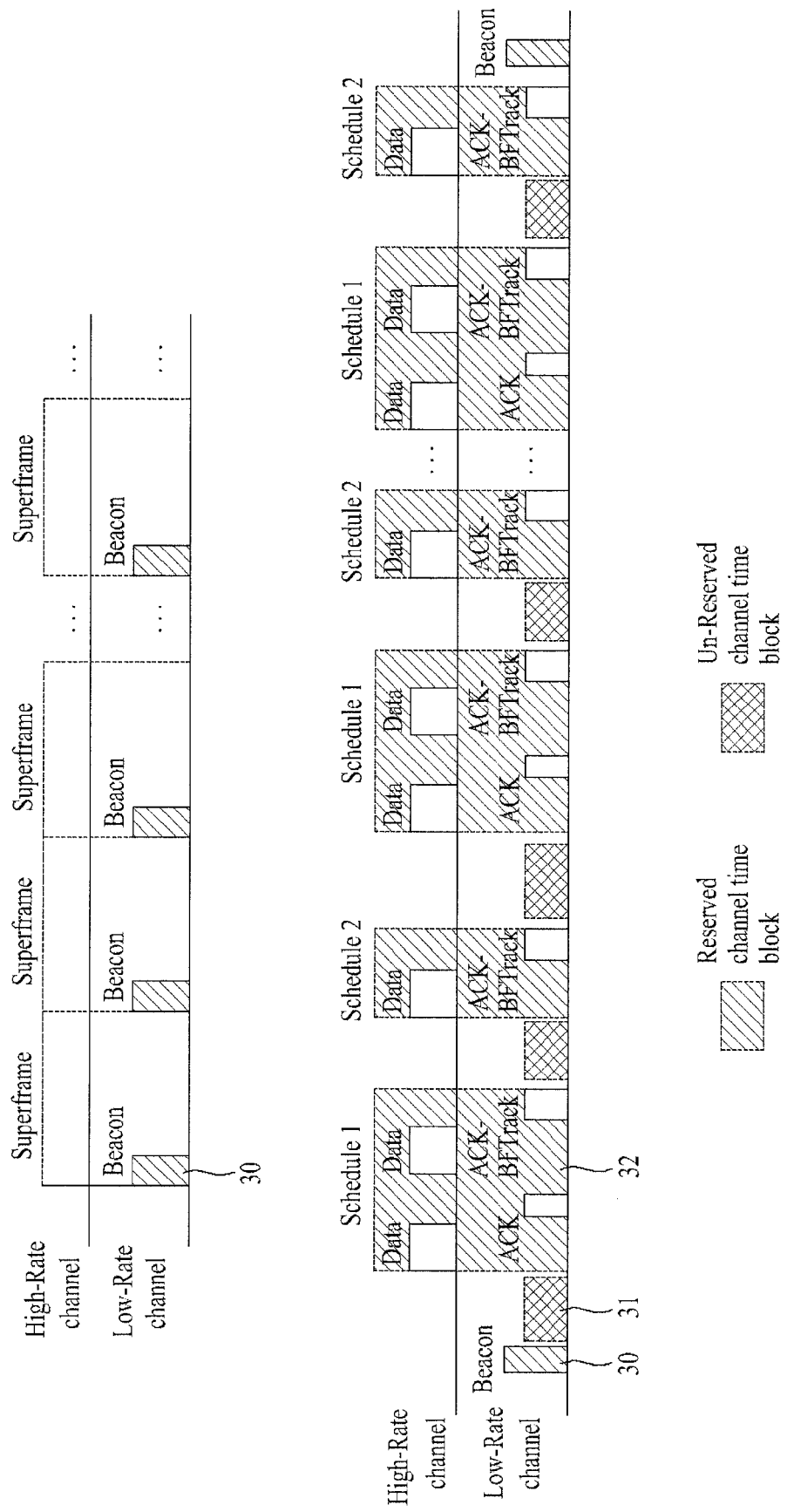
FIG. 6 is a diagram illustrating another example of a structure of a superframe used in a WVAN.

FIG. 6 is a diagram illustrating another example of a structure of a superframe used in a WVAN. Referring to FIG. 6, each superframe includes a beacon field 30 where a beacon is transmitted, a reserved channel time block 32, and an unreserved channel time block 31. Each of the channel time blocks (CTB) is time-divided into a HRP region to which data are transmitted through the HRP layer and a LRP region to which data are transmitted through the LRP layer. The beacon 30 is periodically transmitted by the coordinator to identify a beginning part of each superframe, and includes scheduled timing information and management and control information of the WVAN. The device can exchange data in the network through the timing information and management/control information included in the beacon.

In the HRP region, the reserved CTB field can be used to transmit data from a device, to which channel time is allocated by the coordinator in accordance with a channel time allocation request of the device, to other device. If a specific device transmits data to other device through the reserved CTB field, the HRP channel is used. If the device that receives the data transmits ACK/NACK signal of the received data, the LRP channel is used.

The unreserved CTB field can be used to transmit control information, MAC command, or asynchronous data between the coordinator and the device or between the devices. In order to prevent data collision between the devices in the unreserved CTB field, a carrier sense multiple access (CSMA) mode or a slotted Aloha mode can be used. If there are many kinds of control information or commands to be transmitted, the reserved region can be set in the LRP channel. In each superframe, the length and the number of reserved CTB fields and unreserved CTB fields can be varied per superframe and are controlled by the coordinator.

Furthermore, although not shown in FIG. 6, each superframe includes a contention-based control period (CBCP) located next to the beacon to transmit urgent control/management messages. The length of the CBCP is set so as not to exceed a given threshold value mMAXCBCPLen.

Figure 7:
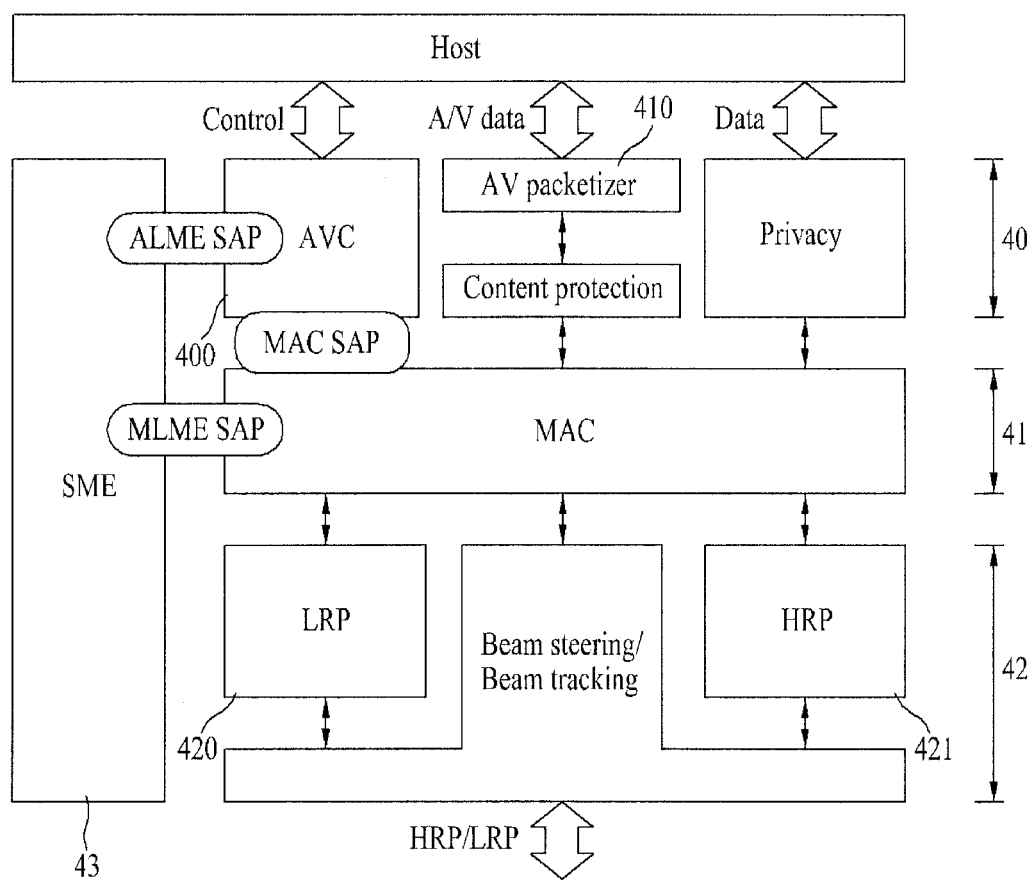
FIG. 7 is a diagram illustrating a protocol layer structure implemented in a device of a WVAN.

FIG. 7 is a diagram illustrating a protocol layer structure implemented in a device of a WVAN.

Referring to FIG. 7, a communication module of each device included in the WVAN can include four layers depending on its function. Generally, the communication module includes an adaptation sublayer 40, a MAC layer 41, a PHY layer 42, and a station management entity (SME) layer 43. In this case, a station is a device for identifying the coordinator, and the station management entity (SME) means a device management entity (DME). The station management entity (SME) is a layer independent entity that controls a lower layer and collects status information of device from each layer. The station management entity SME includes entities that manage each layer of the communication module. In this case, an entity that manages the MAC layer will be referred to as a MAC layer management entity (MLME), and an entity that manages the adaptation layer will be referred to as an adaptation layer management entity (ALME).

The adaptation sublayer 40 includes an AVC protocol 400 and an A/V packetizer 410. The AVC protocol 400 is an upper layer that performs device control and streaming connection for A/V data transmission between a transmitting device and a receiving device. The A/V packetizer 410 formats A/V data for HRP data service.

The MAC layer 41 takes the role in link setup, connection or non-connection, and channel access to a lower layer of a material transmission protocol, and also takes the role in reliable data transmission. In other words, the MAC layer 41 serves to transmit a control/data message or control a channel.

The PHY layer 42 directly processes A/V data, or the A/V data may be processed simultaneously by the PHY layer 42 and the MAC layer 31. The PHY layer is responsible for the task to convert a message requested from the upper layers such as the adaptation layer 30 and the MAC layer 41, so that the message can be sent and received between devices by the PHY layer. Also, the PHY Layer includes the aforementioned two kinds of physical layers, HRP layer 420 and LRP layer 421.

The layers of the device provide services such as a high rate service, a low rate service, and a management service. The high rate service is used for video, audio and data transfer, and the low rate service is used for transmission of audio data, MAC command, and asynchronous data of small capacity. The respective layers transmit and receive a simple message to and from each other before a process of data exchange is performed between the respective layers. The message exchanged between such different layers is referred to as primitive.

Figure 8:
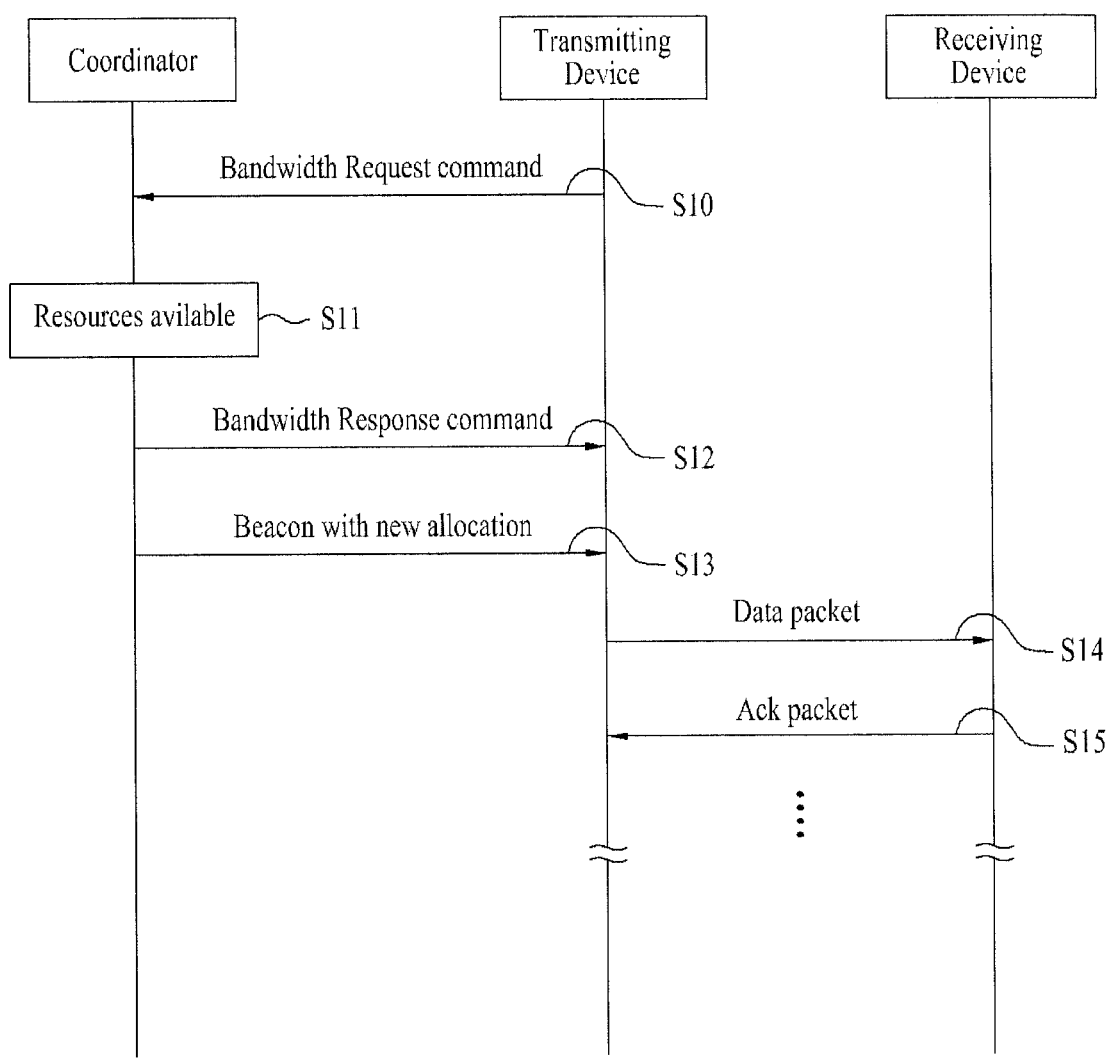
FIG. 8 is a diagram illustrating an example of a procedure of transmitting and receiving signals between WVAN devices according to one embodiment of the present invention.

FIG. 8 is a diagram illustrating an example of a procedure of transmitting and receiving signals between WVAN devices according to one embodiment of the present invention.

In more detail, FIG. 8 illustrates an example of a procedure of transmitting data from a random device to another device by using channel resources of certain amount allocated from a coordinator. For convenience of description, a device that transmits data will be referred to as a transmitting device, and a device that receives data will be referred to as a receiving device.

Referring to FIG. 8, the transmitting device transmits a channel resource request command (bandwidth request command) to the coordinator to receive channel resources for data transmission (S10). The bandwidth request command is used by the transmitting device to request the coordinator to allocate, change or terminate channel resources, whereby the transmitting device can perform the procedure related to data transmission to the coordinator or the receiving device. The coordinator that has received the request message searches for available channel resources to be allocated to the transmitting device (S11). At this time, the coordinator searches for a channel having a minimum interference rate, and as a result, if there are available channel resources, the coordinator transmits a bandwidth response command, which indicates that the requested channel resources will be allocated, to the transmitting device (S12). The coordinator transmits information of range or type of the channel resources, which are to be newly allocated, to the transmitting device through a beacon (S13). In this case, since the coordinator broadcasts various kinds of information related to the WVAN through the beacon, the receiving device can also receive the beacon that includes the information of the WVAN. The beacon includes timing allocation information, information of other devices within the WVAN, and control information broadcasted by the coordinator to control and manage the WVAN.

The transmitting device that has received the channel resources of the certain amount from the coordinator transmits data packets to the receiving device through the channel resources, wherein the data packets include audio/video (A/V) data (S14). At this time, the data packets are transmitted through the HRP channel. The receiving device transmits an ACK packet for acknowledgement of the data packets to the transmitting device (S15). Afterwards, the procedure of transmitting data packets and their ACK packet can be repeated several times.

The ACK packet type can be divided into a directional ACK packet and an omni-directional ACK packet depending on directivity of the ACK packet. According to one embodiment of the present invention, the type of the ACK packet and its signal transmission coverage can be controlled adaptively depending on the wireless network environment to which the devices belong. The type of the ACK packet and its signal transmission coverage can be controlled by the coordinator.

Figure 9:
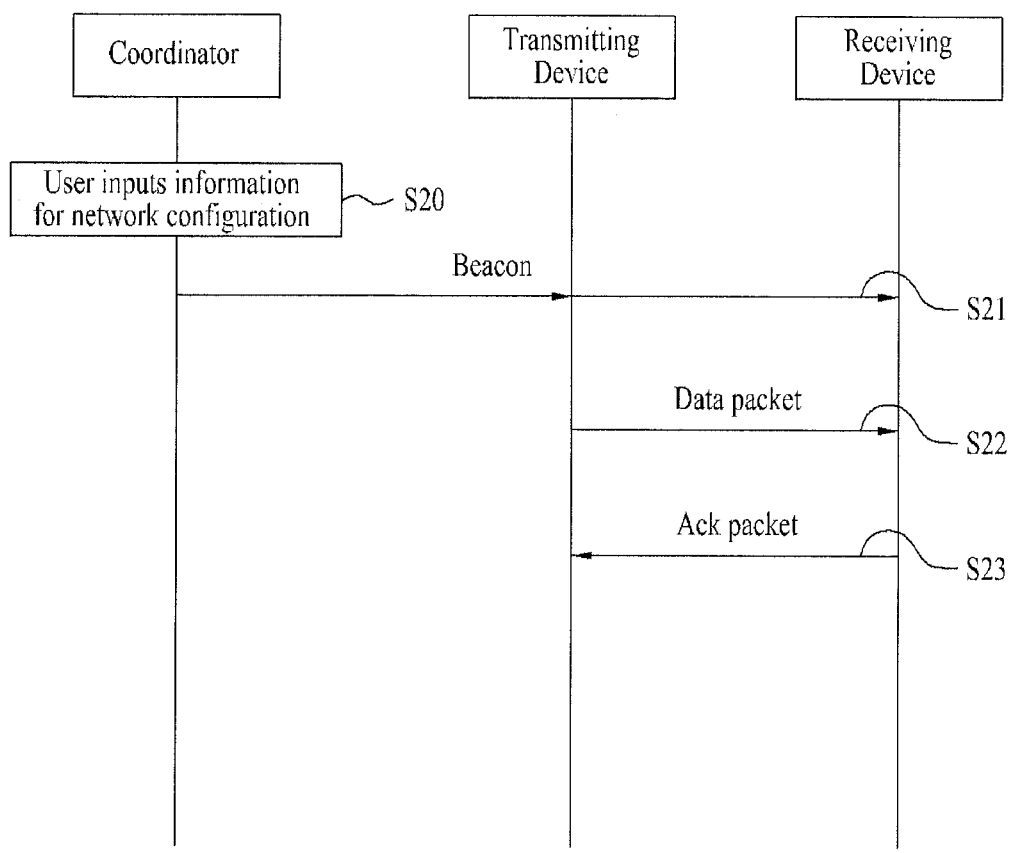
FIG. 9 is a diagram illustrating an example of a procedure of transmitting and receiving signals for wireless environment adaptation between WVAN devices according to one embodiment of the present invention.

FIG. 9 is a diagram illustrating an example of a procedure of transmitting and receiving signals for wireless environment adaptation between WVAN devices according to one embodiment of the present invention. Although the coordinator may simultaneously transmit the beacon to a plurality of devices through beacon broadcast, FIG. 9 illustrates only one device for briefness of description. Also, it is based on that the coordinator performs steps S10 to S13 of FIG. 8 of receiving channel resources of a certain amount in accordance with the request of the device.

Referring to FIG. 9, the user inputs information of the wireless network environment to the coordinator that belongs to the wireless network, so as to control a plurality of devices, which belong to the wireless network, to be operated adaptively to the wireless network (S20). Input of information of the wireless network environment by the user will be described with reference to FIG. 10 and FIG. 11.

The coordinator broadcasts at least one of transmission coverage information related to signal transmission coverage of the plurality of devices belonging to the wireless network and ACK packet type information indicating the type of the ACK packet transmitted for acknowledgement of the data packets transmitted between the plurality of devices based on the information input by the user, wherein the broadcasted information is included in the beacon (S21).

The signal transmission coverage can be represented by the distance between respective devices belonging to the wireless communication environment controlled by the coordinator when the distance between the respective devices including the coordinator is maximum. Alternatively, the signal transmission coverage may be determined based on an area of a place to which the coordinator belongs, or may be set randomly depending on a setting entity.

The type of the ACK packet is divided depending on a transmission direction of the ACK packet. In more detail, the ACK packet includes a directional ACK packet transmitted from one device to a specific device and an omni-directional ACK packet transmitted from one device to a plurality of devices.

The transmitting device that has received the beacon broadcasted from the coordinator can receive at least one of the signal transmission coverage included in the beacon and the information of directivity of the ACK packet. At this time, the transmitting device can perform transmit power control based on the information of the signal transmission coverage when transmitting data packets to the receiving device (S22).

The receiving device that has received the data packets from the transmitting device transmits the ACK packet for acknowledgement of the data packets to the transmitting device. At this time, it is based on that the receiving device also receives the beacon broadcasted from the coordinator in step S20. The receiving device can transmit the directional ACK packet or the omni-directional ACK packet to the transmitting device depending on the type information of the ACK packet included in the beacon. However, the receiving device is not necessarily needed to transmit the ACK packet indicated by the coordinator. Also, the receiving device can control transmission power used for transmission of the ACK packet based on the information of the signal transmission coverage included in the beacon (S23).

Figure 10:
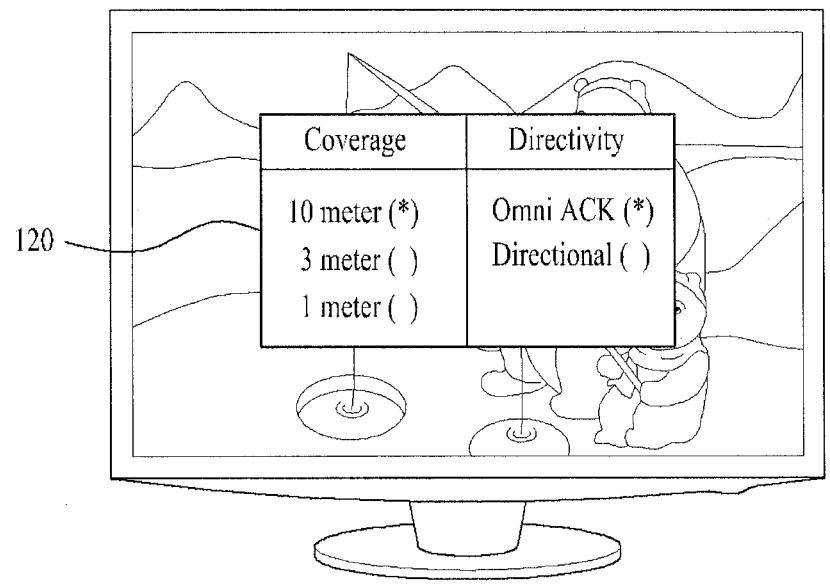
FIG. 10 is a front perspective view illustrating an example of a display module of a WVAN coordinator according to one embodiment of the present invention.
Figure 11:
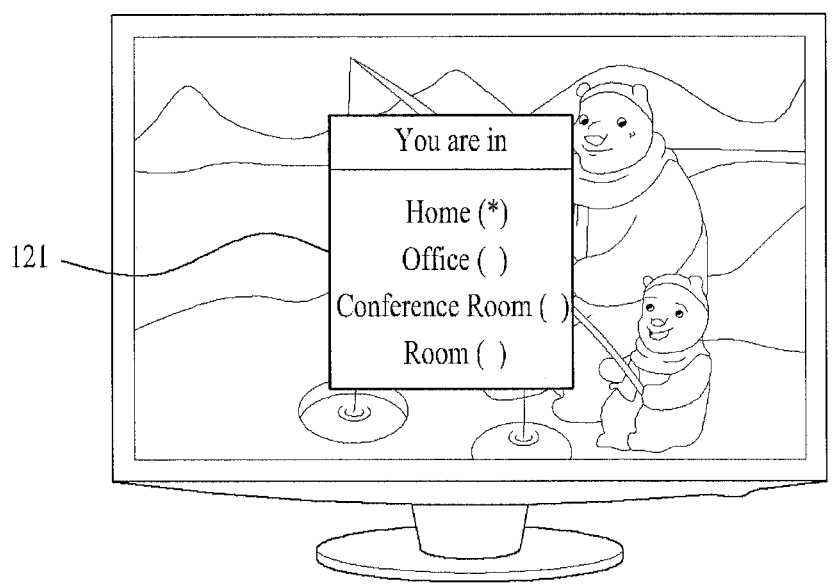
FIG. 11 is a front perspective view illustrating another example of a display module of a WVAN coordinator according to one embodiment of the present invention.

Hereinafter, an example of a method for inputting information of the user in step S20 will be described with reference to FIG. 10 and FIG. 11. However, input of information by the user in FIG. 10 and FIG. 11 is related to, but not limited to, a coordinator provided with a display module. In this case, the user can input environment information by using a setting button provided in a body of the coordinator.

FIG. 10 is a front perspective view illustrating an example of a display module of a WVAN coordinator according to one embodiment of the present invention. In more detail, FIG. 10 illustrates an example that a setting window for input of information by the user is displayed.

Referring to FIG. 10, if an environment setting function for wireless environment adaptation is activated in the coordinator in accordance with selection of the user, a parameter setting window 120 of the wireless environment is output on a front surface of the display module of the coordinator. The setting window 120 can include lower menus that allow the user to set at least one of the signal transmission coverage and the type of the ACK packet in accordance with the wireless network environment to which the coordinator belongs.

The user can select a case where the signal transmission coverage is within 1 m, a case where the signal transmission coverage is corresponds to 1~3 m, and a case where the signal transmission coverage corresponds to 3~10 m through a detailed menu for inputting the transmission coverage. Also, the user can determine whether the type of the ACK packet to be used by the wireless network is a directional ACK packet or an omni-directional ACK packet, through the setting window 120.

The user can set action parameters of the devices adaptively to the wireless network environment by using a menu setting button provided in a display module or a remote controller. The setting menu shown in FIG. 10 is only exemplary to assist understanding of the present invention. The setting menu may be configured in various manners depending on the user, such as a menu that sets signal transmission coverage only or a menu that sets ACK packet type only.

Meanwhile, the signal transmission coverage or the ACK packet type according to one embodiment of the present invention is set based on the environment to which the coordinator and the device belong. According to another embodiment of the present invention, the user can input information related to the wireless network in the coordinator, wherein the signal transmission coverage or the ACK packet type can be drawn from the information.

FIG. 11 is a front perspective view illustrating another example of a display module of a WVAN coordinator according to one embodiment of the present invention. In more detail, FIG. 11 illustrates another example that a setting window for input of information by the user is displayed.

Referring to FIG. 11, if an environment setting function for wireless environment adaptation is activated in the coordinator in accordance with selection of the user, a parameter setting window 121 of the wireless environment is output on a front surface of the display module of the coordinator. The setting window 121 can include a lower menu that allows the user to input location information, such as room, home, office, and conference room, in accordance with the wireless network environment to which the coordinator belongs. If the user inputs the information of the wireless environment, the coordinator draws at least one of the transmission coverage information and the ACK packet type information, which are associated with the input wireless environment information, from a wireless environment parameter list, which is previously set.

Table 1 illustrates an example of the wireless environment parameter list previously set in the coordinator according to one embodiment of the present invention.

TABLE 1

| Coordinator Location | Signal Transmission Coverage (m) | ACK Directivity |
|---|---|---|
| Room | 0~1 | Directional ACK |
| Home | 0~3 | Directional ACK |
| Office | 0~3 | Directional ACK |
| Conference Room | 3~10 | Omni-Directional ACK |
| ... | ... | ... |

Referring to Table 1, information of ACK packet directivity to be recommended and predicted signal transmission coverage can previously set in the coordinator depending on location information of the coordinator. Accordingly, the coordinator can draw the information of ACK packet directivity and signal transmission coverage and broadcast the drawn information through the beacon.

For example, if the user inputs location information of the coordinator as 'conference room', the signal transmission coverage of the device is 3~10 m in the conference room of Table 1. Accordingly, the coordinator can draw the ACK packet information that recommends omni-directional ACK packet and the transmission coverage information from the list and broadcast the drawn information through the beacon.

Hereinafter, an example of a data format that includes information for wireless environment adaptation, which is transmitted from the coordinator to a plurality of devices, will be described in accordance with one embodiment of the present invention.

According to one embodiment of the present invention, the information of the signal transmission coverage and the ACK packet directivity, which are transmitted by being included in the beacon, for example, can be included in a vendor specific information element (IE) type that includes vendor specific parameter information. However, the information is necessarily needed to be included in the vendor specific IE, and may be transmitted in various data formats depending on the user.

Figure 12:
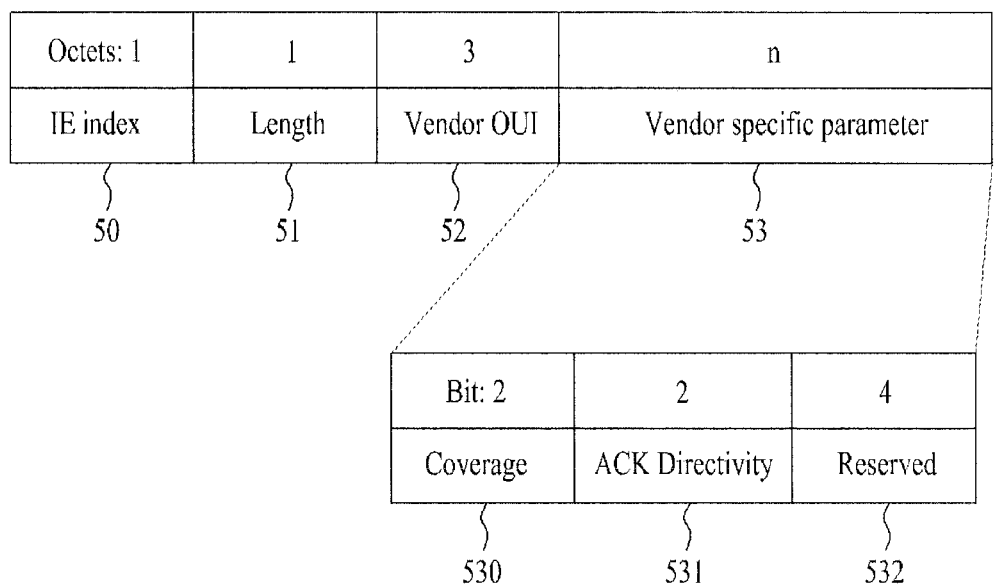
FIG. 12 is a diagram illustrating an example of a data format according to one embodiment of the present invention.

FIG. 12 is a diagram illustrating an example of a data format according to one embodiment of the present invention. In more detail, FIG. 12 illustrates an example of a vendor specific IE format.

The vendor specific IE according to one embodiment of the present invention corresponds to requirements that depart from a general vendor property and includes a vendor specific parameter defined for various uses of the user.

Referring to FIG. 12, the general vendor specific IE format includes an IE index field 50 that includes IE index information, a length field 51 that includes length information of the IE format, a vendor OUI field 52 that includes OUI (organizationally unique identifier) of the vendor, and a vendor specific parameter field 53 that includes vendor specific parameter information.

The vendor OUI field 52 is a field that includes unique identification information of the vendor, and includes information of a unique code given from an international institute officially approved, for example, IEEE standard association registration authority committee (RAC).

The parameter information included in the vendor specific parameter field 53 is distinguished from a general vendor feature and can be configured in various manners depending on a vendor feature. The data format constituting the vendor specific parameter field 53 can be configured in various manners. If the vendor specific parameter field 53 includes vendor operational parameter information in accordance with one embodiment of the present invention, the vendor specific parameter field 53 can be designated as a vendor operational parameter field and can be allocated with 1 octet. Hereinafter, the vendor specific parameter field will be referred to as an operational parameter field.

The operational parameter field 53 can include information of signal transmission coverage and ACK packet directivity subject to user input information in accordance with one embodiment of the present invention. Accordingly, the operational parameter field 53 includes a coverage field 530 that includes information of signal transmission coverage, an ACK directivity field 531 that includes information of ACK type, and a reserved field 532.

The signal transmission coverage included in the coverage field 530 may be determined based on the distance, which is measured based on both devices located at a maximum distance from each other among a plurality of devices belonging to the wireless network as described above, or may be determined depending on a location property of the coordinator.

It is assumed that 2 bits are allocated to the coverage field 530. In this case, it is noted that the signal transmission coverage is within 3~10 m if a bit of '00' is set to the coverage field 530. It is noted that the signal transmission coverage is 1~3 m if a bit of '01' is set to the coverage field 530 and the signal transmission coverage is within 1 m if a bit of '10' is set to the coverage field 530. However, the above bit values are only exemplary for description of the present invention. Accordingly, the bit values may be varied, and various kinds of detailed information of the signal transmission coverage can be transferred as the number of bits allocated to the signal transmission coverage 530 is increased.

The information of the transmission coverage can be used to determine the type of the ACK packet transmitted from the device that receives data. Also, the device can control the transmission power used during signal transmission based on the information of the signal transmission coverage. For example, if the signal transmission coverage is wide, the power required for signal transmission is increased. If the signal transmission coverage is narrow, the required power is decreased.

The ACK directivity field 531 that includes the ACK packet type information includes information that specifies the ACK packet type depending on the environment to which devices belong, among ACK packet types divided depending on directivity of the ACK packet. For example, the ACK packet can be determined adaptively depending on various wireless environments such as the distance between the respective devices belonging to the wireless network, the number of devices, and an environmental factor of a place where the devices are located.

For example, it is assumed that 1 bit is allocated to the ACK directivity field 531. In this case, it is noted that the ACK packet is short and an omni-directional ACK packet that can be transmitted in all directions can be used if a bit value is set to '0' in the ACK directivity field 531. Also, it is noted that use of a directional ACK packet transmitted along a specific path, having a small interference rate is recommended if a bit value is set to '1' in the ACK directivity field 531. This is only exemplary for description of the present invention. The bit values of '1' and '0' may be varied to each other.

For example, if the distance between the devices is within 1 m, the coordinator includes information indicating that the signal transmission coverage of the signal transmission coverage field 530 is 1 m and recommends use of the directional ACK packet that can minimize interference for acknowledgement of the device that has received data through the ACK directivity field 531. For another example, if the distance between the devices is 10 m or so, the coordinator includes information indicating that the signal transmission coverage of the signal transmission coverage field 530 is 10 m or so and recommends use of the omni-directional ACK packet as the signal transmission coverage is enlarged through the ACK directivity field 531.

Meanwhile, the signal transmission coverage and the information of the ACK packet type according to one embodiment of the present invention are not needed to be included in the same data format, and can be transmitted independently. Accordingly, unlike the data format shown in FIG. 12, according to another embodiment of the present invention, the operational parameter field of the vendor specific IE can include a field that includes information of signal transmission coverage and a reserved field. On the other hand, the operation parameter field may include a field that includes directivity information of the ACK packet and a reserved field.

Hereinafter, the ACK packet divided depending on directivity will be described in brief with reference to FIG. 13 to FIG. 16.

The ACK packet includes a directional ACK packet and an omni-directional ACK packet.

The directional ACK packet includes a low-rate physical data unit (LRPDU) and is mainly used for transmission of either ACK packet for HRP packet or beam-formed LRPDU packet. The directional ACK packet can be divided into one that includes a payload field and the other one that does not include a payload field. If the directional ACK packet does not include a payload field, it becomes an LRP packet of a minimum unit. The directional ACK packet that includes a payload field can be used for transmission of beamsearching feedback information and beamforming feedback information.

Figure 13:
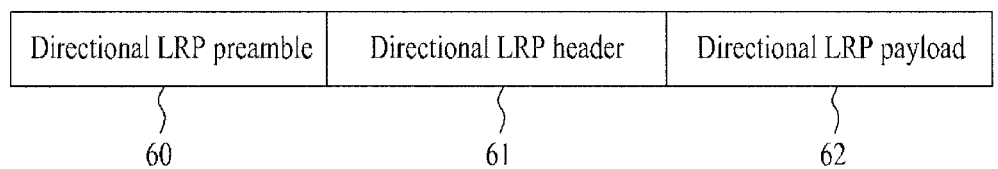
FIG. 13 is a diagram illustrating an example of an LRPDU format according to one embodiment of the present invention.

FIG. 13 is a diagram illustrating an example of an LRPDU format according to one embodiment of the present invention. In more detail, FIG. 13 illustrates a directional LRPDU format that includes a payload field.

Referring to FIG. 13, the directional LRPDU includes a directional LRP preamble field 60, a directional LRP header field 61, and a directional LRP payload field 62. The directional LRP preamble field 60 includes a preamble having 128 sample OFDM training symbols defined on a frequency domain are repeated five times. Information included in the directional LRP header field 61 is coded to one OFDM symbol that uses tail bit convolution encoding of ½ rate.

The directional LRPDU is transmitted through an antenna group of a directional or phased array pattern. At this time, an optimized transmitting antenna direction or pattern at a device that transmits the directional LRPDU is periodically tracked by a device that receives a directional LRP ADT or omni-directional LRP packet that includes a short-omni LRP preamble. An omni-directional LRPDU that includes a long-omni LRP preamble is not used to track the optimized transmitting antenna direction or pattern.

Accordingly, the device according to one embodiment the present invention does not necessarily include information included in the ACK packet type field 531 shown in FIG. 12. Preferably, the device transmits the directional ACK packet or omni-directional ACK packet depending on the direction or pattern of the transmitting antenna group.

Figure 14:
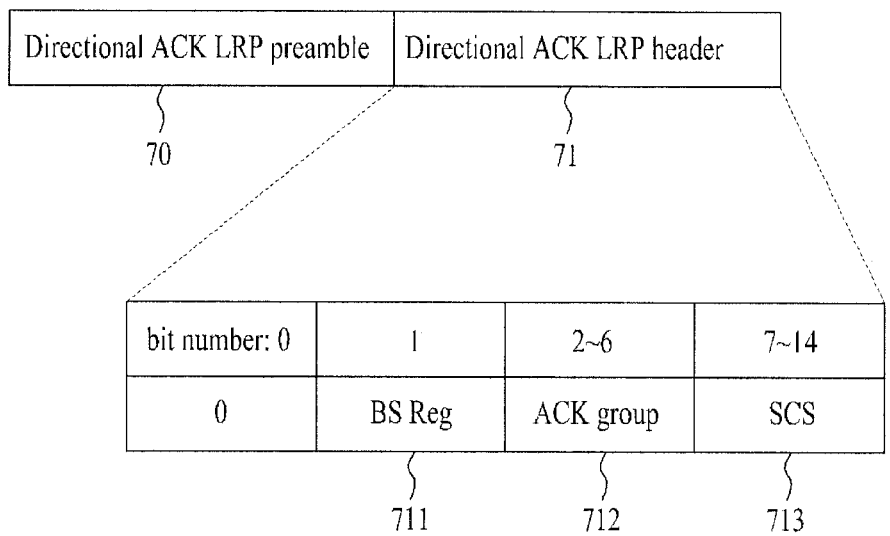
FIG. 14 is a diagram illustrating another example of an LRPDU format according to one embodiment of the present invention.

FIG. 14 is a diagram illustrating another example of an LRPDU format according to one embodiment of the present invention. In more detail, FIG. 14 illustrates an example of a data format of a directional ACK packet.

Referring to FIG. 14, the directional ACK packet includes a directional ACK LRP preamble field 70 and a directional ACK LRP header 71. The directional ACK packet of FIG. 14 includes a data format that excludes the directional LRPDU payload field 62 from the directional LRPDU format shown in FIG. 13.

The directional LRP header 71 includes a first field 710 that includes information indicating whether the directional ACK packet includes a payload field, a field 711 (BS Req.) that includes beamsearching request information, an ACK group field 712 that includes ACK/NACK information for acknowledgement, and a short check sequence (SCS) field 713 that includes a short check sequence for error check.

The first field 710 includes information indicating whether the directional ACK packet includes a payload field. The directional ACK packet includes an LRPDU format excluding a payload field. The second bit from the bits set in the unidirectional ACK LRP header corresponds to the BS Req. field 711.

Five continuous bits from the third bit of the bits set in the unidirectional ACK LRP header correspond to the ACK group field 712. The ACK group includes ACK group information indicating whether data transmitted from the transmitting device have been received exactly without loss or error. The ACK group field 712 can include n kinds of ACK group information. Since one bit is allocated to one ACK group, the ACK group field 712 can include maximum five ACK groups. For example, if a subpacket included in the data packet is transmitted exactly, a bit corresponding to the nth ACK group is set to '1'. If a subpacket included in the data packet is not transmitted due to loss or error, a bit corresponding to the nth ACK group is set to '0'.

The directional ACK packet format shown in FIG. 14 may be transmitted as it is or in a type of beamforming ACK packet. The beamforming ACK packet is useful when a transmission path cannot be specified like that location information of the transmitting device is indefinite, whereas it may cause high overhead.

Meanwhile, the omni-directional ACK packet includes an omni-directional LRPDU format, and is mainly used for transmission of a broadcasting signal or multiple LRP packets.

Figure 15:
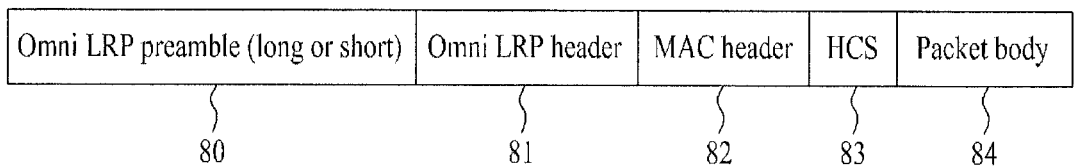
FIG. 15 is a diagram illustrating another example of an LRPDU format according to one embodiment of the present invention.

FIG. 15 is a diagram illustrating another example of an LRPDU format according to one embodiment of the present invention. In more detail, FIG. 15 illustrates an example of an omni-directional LRPDU format.

Referring to FIG. 15, the omni-directional ACK packet according to one embodiment of the present invention includes an omni-directional LRP preamble field 80, an omni-directional LRP header 81, a MAC header 82, an HCS field 83, and a packet body 84.

The omni-directional LRPDU can be divided into two types, a long omni LRPDU and a short omni LRPDU depending on whether a long omni LRP preamble or a short omni LRP preamble is included in the omni-directional LRP preamble field 80.

An example of a channel resource used to transmit a data packet includes a channel time block (CTB). For the CTB used for transmission of omni-directional LRP packet, an inter-packet period (IPP) required for packet transmission can be used. The IPP means a period between packets which are transmitted, and one CTB includes multiple IPPs. One data packet and its ACK packet can be transmitted within the IPP. The first omni-directional LRP packet can be transmitted from the LRP CTB by using the short omni LRP preamble. If the IPP is used for the CTB, the short omni LRP preamble can be used for continuous packets. If not so, the long omni LRP preamble can be used. All omni-directional ACK packets include a short preamble.

Figure 16:
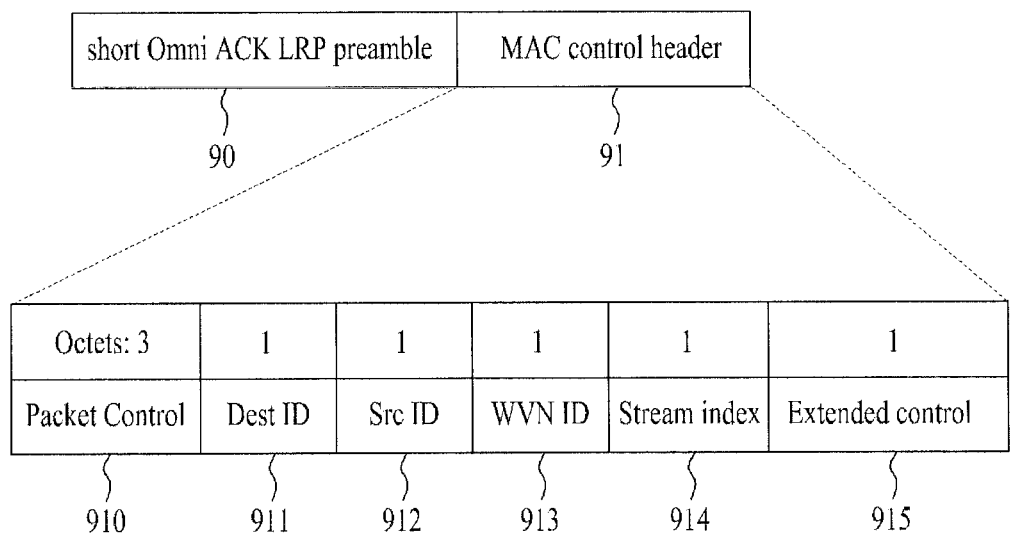
FIG. 16 is a diagram illustrating another example of an LRPDU format according to one embodiment of the present invention.

FIG. 16 is a diagram illustrating another example of an LRPDU format according to one embodiment of the present invention. In more detail, FIG. 16 illustrates an example of an omni-directional ACK LRP format.

Referring to FIG. 16, the omni-directional ACK LRP according to one embodiment of the present invention includes a short omni ACK LRP preamble field 90 and a MAC control header 91.

The MAC control header 91 includes a packet control field 910 that includes information indicating whole control of the packet, an Src ID field 911 for setting STID of a first device, which is intended to transmit A/V data, at the wireless network, a Dest ID field 912 for setting STID of a second device, which receives the A/V data, a WVN ID field 913 for identifying a WVAN network that includes the devices, a stream index field 914, and an enlarged control field 915.

The packet control field 910 includes packet type information indicating whether the packet type is a normal packet, a composite packet, an omni-directional ACK/HRP ACK packet, or beacon.

The aforementioned omni-directional ACK LRP can be used acknowledgement of data transmitted in a type of omni-directional LRP packet. Unlike the directional ACK packet, the omni-directional ACK LRP packet can be transmitted to several devices at the same time. Accordingly, the MAC layer of the device that has received the omni-directional ACK LRP packet can determine whether the ACK packet is an acknowledgement signal of the data packet transmitted from the device, based on identification information (Dest ID, Src ID) included in the packet. If the ACK packet is not the acknowledgement signal of the data packet, it may be regarded as noise.

Meanwhile, since the omni-directional ACK packet has a data format shorter than that of the directional ACK packet, beamforming is not required during omni-directional transmission. However, interference may occur between the ACK packets.

Next, according to another embodiment of the present invention, the devices can request the coordinator of information required for signal transmission, whereby the devices can perform optimized communication depending on the environment to which the devices belong.

Figure 17:
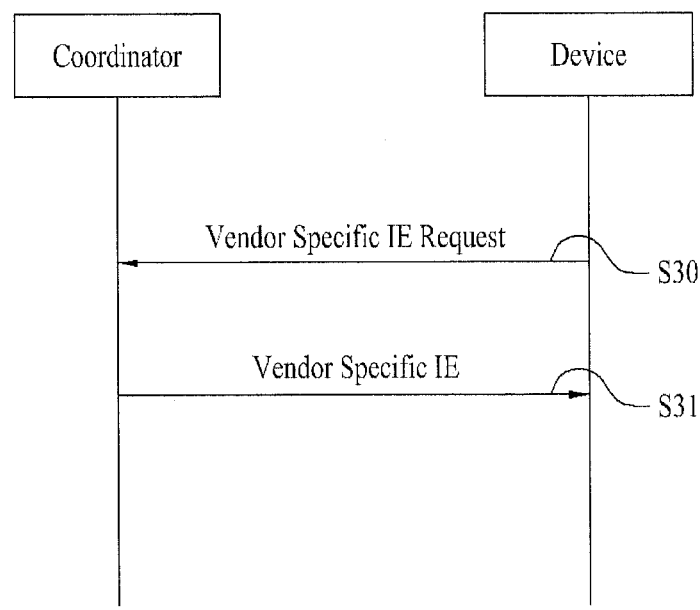
FIG. 17 is a diagram illustrating another example of a procedure of transmitting and receiving signals for wireless environment adaptation between WVAN devices according to one embodiment of the present invention.

FIG. 17 is a diagram illustrating another example of a procedure of transmitting and receiving signals for wireless environment adaptation between WVAN devices according to one embodiment of the present invention. For briefness of the description, FIG. 17 illustrates one device only. Also, FIG. 17 is based on that the coordinator performs the steps S10 to S13 of FIG. 8 corresponding to the procedure of allocating a channel resource of a certain amount from a coordinator to a device in accordance with a request of the device.

Referring to FIG. 17, the device according to one embodiment of the present invention transmits a command to the coordinator to request the coordinator of information of a wireless environment to control the coordinator to be operated adaptively to the wireless environment (S30). At this time, a probe request command can be used as the information request command used to request a random IE.

The coordinator that has received the request command transmits receiving signal coverage and directivity information of ACK packet to the device in response to the request command (S31). At this time, the receiving signal coverage and the directivity information of ACK packet can be included in a probe response message.

The probe request command and the probe response command are requested from a random device to another device to request a requested IF, and are transmitted in, but not limited to, a type of MAC command.

FIG. 18 is a diagram illustrating an example of a probe request command format transmitted from a WVAN device according to one embodiment of the present invention.

Referring to FIG. 18, a probe request message transmitted from the device to the coordinator includes a command ID field 100 that includes identification information indicating a command type in a type of MAC command, a length field 101 indicating a length of a MAC command, and an IE index field 102 (IE index n) that includes indexes of at least one or more information elements.

The IE index field 102 includes index information of an IE to be requested by the device that transmits the probe request message. Accordingly, the IE index field 102 can include index information of a vendor specific IE according to another embodiment of the present invention.

The coordinator that has received the probe request message transmits the probe response command, which includes the vendor specific IE, to the device.

FIG. 19 is a diagram illustrating an example of a probe response command format transmitted from a WVAN coordinator according to one embodiment of the present invention.

Referring to FIG. 19, the probe response command includes a command ID field 110 that includes an identifier indicating a command type, a length field 111 indicating a length of a MAC command, and an IE field (IE n) 112 that includes at least one or more information elements. A random one of the IE field 112 can include a vendor specific IE according to one embodiment of the present invention. At this time, the vendor specific IE includes an operational parameter of the vendor, and can include at least one of information of signal transmission coverage and information of ACK packet type recommended by the coordinator, as shown in FIG. 12.

Figure 20:
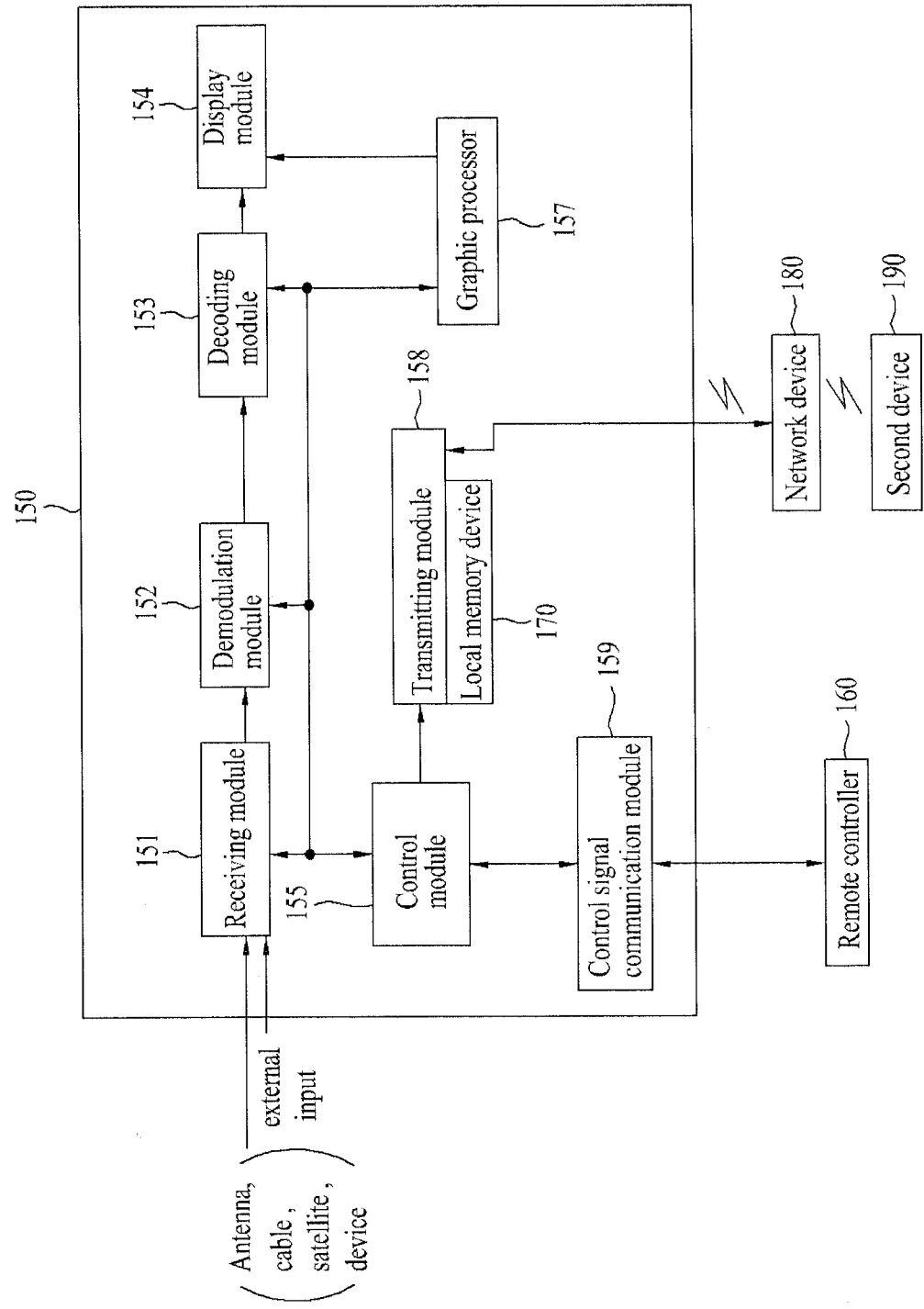
FIG. 20 is a diagram illustrating an example of a broadcasting signal transmission system that includes a WVAN device according to another embodiment of the present invention.

FIG. 20 is a diagram illustrating an example of a broadcasting signal transmission system that includes a WVAN device according to another embodiment of the present invention.

Generally, the WVAN device can play A/V data through processes which will be described layer, wherein the A/V data are input from at least one of a broadcasting station, cable, satellite, and other WVAN device through an antenna. FIG. 20 illustrates an example of a broadcasting signal system that includes a coordinator according to one embodiment of the present invention.

Referring to FIG. 20, the broadcasting signal processing system according to the embodiment of the present invention includes a coordinator 150, a user input module 160 such as a remote controller, a local memory device 170, and a network device 180 for performing wireless communication with a transmitting device 190.

The coordinator 150 that receives A/V data includes a receiving module 151, a demodulation module 152, a decoding module 153, a display module 154, a control module 155, a graphic processor 157, a transmitting module 158, and a control signal communication module 159. In the example of FIG. 20, the transmitting device further includes a local memory device 170 directly connected with the transmitting module 158 that includes input and output ports. However, the local memory device 170 may be a memory device mounted in the transmitting device 150.

The transmitting module 158 can communicate with a wire/wireless network device 180, and can be connected with at least one device 190 through the network device 180, wherein the at least one device 190 exists on the wireless network. The control signal communication module 159 receives a user control signal in accordance with a user control device, for example, a remote controller, and outputs the received signal to the control module 155.

The receiving module 151 could be a tuner that receives a broadcasting signal of a specific frequency through at least one of ground wave, satellite, cable, and Internet network. The receiving module 151 may be provided respectively for each of broadcasting sources, for example, ground wave broadcasting, cable broadcasting, satellite broadcasting, and personal broadcasting. Alternatively, the receiving module 151 may be a unified tuner. Also, supposing that the receiving module 151 is a tuner for ground wave broadcasting, at least one digital tuner and at least one analog tuner may be provided respectively, or a digital/analog tuner may be provided.

Furthermore, the receiving module 151 may receive internet protocol (IP) streams transferred through wire and wireless communication. If the receiving module 151 receives IP streams, the receiving module 151 can process transmitting and receiving packets in accordance with an IP protocol that establishes source and destination information for received IP packets and packets transmitted from the receiver. The receiving module 151 can output video/audio/data streams included in the received IP packets in accordance with the IP protocol, and can generate transport streams to be transmitted to the network as IP packets in accordance with the IP protocol so as to output them. The receiving module 151 is an element that receives an externally input video signal, and, for example, may receive IEEE 1394 type video/audio signals or HDMI type streams from the outside.

The demodulation module 152 demodulates broadcasting signals among data input through the receiving module 151 or broadcasting signals transmitted from the receiving device in an inverse order of a modulation mode. The demodulation module 152 outputs broadcasting streams by demodulating the broadcasting signals. If the receiving module 151 receives stream type signals, for example, IP streams, the IP streams are output to the decoding module 153 after bypassing the demodulation module 152.

The decoding module 153 includes an audio decoder and a video decoder, and decodes the broadcasting streams output from the demodulation module 152 through a decoding algorithm and outputs the decoded streams to the display module 154. At this time, a demultiplexer (not shown) that splits each stream in accordance with a corresponding identifier may additionally be provided between the demodulation module 152 and the decoding module 153. The demultiplxer splits the broadcasting signals into an audio element stream (ES) and a video element stream and outputs them to each decoder of the decoding module 153. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The display module 154 displays broadcasting contents received from the receiving module 151 and contents stored in the local memory device 170. The display module 154 can display a menu indicating whether the memory device has been mounted in the transmitting device and information related to the remaining capacity of the memory device, in accordance with a control command of the control module 155, and can be operated under the control of the user. The display module 154 can display a setting menu window so that the user can input vendor operational parameter setting information in accordance with the embodiments of the present invention, as shown in FIG. 18 and FIG. 19.

The control module 155 can control the operations of the aforementioned modules (receiving module, demodulation module, decoding module, display module, graphic processor, spatial multiplexing precoder and beamforming module, and interface module). Also, the control module 155 displays a menu that receives a control command of the user, and drives an application that displays various kinds of information or menu of the broadcasting signal processing system for the user.

For example, the control module 155 can read out the contents stored in the local memory device 170 if the local memory device 170 is mounted in the transmitting device. Also, the control module 155 can control the operation of the local memory device 170 so that the broadcasting contents received from the receiving module 151 are stored in the local memory device 170 if the local memory device 170 is mounted in the transmitting device. Furthermore, the control module 155 can output a control signal for mounting the local memory device 170 depending on whether the local memory device 170 has been mounted in the transmitting device.

The control module 155 checks remaining memory capacity of the local memory device 170, and allows information of the remaining memory capacity to be displayed for the user on the display module 154 through the graphic processor 157. The control module 155 can shift the contents stored in the local memory device 170 to the remote memory device if the remaining memory capacity of the local memory device 170 is not sufficient. In this case, the control module 155 can display a menu indicating whether to shift the contents stored in the local memory device 170 to another local memory device (not shown) or the remote memory device through the display module 154. And, the control module 155 can receive and process a user control signal of the menu. Accordingly, the control module 155 can allow the contents stored in the local memory device 170 and other directly or remotely mounted memory device to be shifted between them and stored therein.

Also, the control module 155 can transmit the vendor specific IE, which includes vendor operational parameter information subject to user input, to the device 190 belonging to the same network, through the beacon. Also, a vendor operational parameter list, which includes one or more of information of signal transmission coverage associated with a place where the wireless network is implemented and information of ACK packet type, can previously be set in the control module 155. In this case, the control module 155 can draw the information of signal transmission coverage and the information of ACK packet type from the vendor operational parameter list based on specific location information input through the user input module.

The graphic processor 157 processes a graphic to be displayed so that a menu screen is displayed in a video image displayed by the display module 154, and controls the graphic to be displayed in the display module 154 together with the menu screen.

The transmitting module 158 can be used to transmit the data packet generated by the control module 155 to other device 190 through the wire and wireless network, or transmit data from the transmitting device 150 to another device.

Also, the transmitting module 158 can include an interface module to perform bidirectional communication between the devices belonging to the WVAN. The interface module can be interfaced with at least one other device 190 through the wire and wireless network. Examples of the interface module include Ethernet module, Bluetooth module, short distance wireless Internet module, portable Internet module, home PNA module, IEEE1394 module, PLC module, home RF module, and IrDA module.

Meanwhile, the receiving device which is an example of the device according to one embodiment of the present invention can be included in the broadcasting receiving system shown in FIG. 20. In this case, all the modules of the receiving device are the same as those of the aforementioned WVAN device, and the operation performed by each module of the receiving device is also the same as that performed by each module of the aforementioned WVAN device.

However, the receiving module 151 can receive a beacon, which includes at least one of information of signal transmission coverage indicating a maximum distance among distances between the respective devices belonging to the wireless network, and information indicating ACK packet type for acknowledgment during reception of data packet, from the coordinator of the wireless network. Also, the receiving module 151 can receive at least one data packet from the transmitting device.

The control module 155 generates a signal for acknowledgement of the data packet received through the receiving module 151. Also, the control module 155 determines whether to perform control in accordance with the ACK packet type indication information included in the beacon and controls whether to transmit the ACK packet subject to the determined result to the transmitting device through the transmitting module 158.

The terms herein can be replaced with other terms. For example, "device" can be replaced with user device (or machine), station, etc., and "coordinator" can be replaced with coordinating (control) device, coordinating (or control) station, piconet coordinator (PNC), etc. Also, the WVAN parameter configuring the WVAN can be used to refer to network configuration information.

It will be apparent that some claims referring to specific claims may be combined with another claims referring to the other claims other than the specific claims to constitute the embodiment or add new claims by means of amendment after the application is filed.

Also, examples of devices that can perform communication in a communication system include computers, PDAs, notebook computers, digital TVs, camcorders, digital cameras, printers, mikes, speakers, headsets, bar-code readers, displays, and cellular phones. All digital devices can be used as the devices.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of controlling a network at a receiving device of a wireless network, the method comprising:
    receiving a beacon, which includes of transmission coverage infoiination associated with signal transmission coverage of the wireless network and ACK packet information indicating a type of an ACK packet transmitted from a plurality of devices for acknowledgement during reception of data packets, from a coordinator of the wireless network;
    receiving the data packets from a transmitting device of the wireless network; and
    transmitting an ACK packet according to an ACK packet type determined based on the ACK packet type information included in the beacon to the transmitting device as a signal for acknowledgement of the data packets,
    wherein at least one of the transmission coverage information and the ACK packet type information associated with configuration of the wireless network are input through a user interface of the coordinator of the wireless network.

2. The method of claim 1, further comprising receiving information of location where the wireless network is implemented in respect of the configuration of the wireless network from the coordinator through the beacon, wherein the information of location is input through the user interface.

3. The method of claim 1, wherein the transmission coverage information is determined by a user input for a maximum distance among distances between the plurality of devices belonging to the wireless network.

4. The method of claim 1, wherein the ACK packet type is determined by a user input for a transmission direction of the ACK packet.

5. The method of claim 4, wherein the ACK packet type is a directional ACK packet or an omni-directional ACK packet.

6. The method of claim 1, wherein at least one of the transmission coverage information and the ACK packet type information is broadcasted through the beacon by being included in a vendor specific information element (IE), and a data format of the vendor specific IE includes an IE index field that includes index information indicating that an IE broadcasted by the coordinator is the vendor specific IE, a vendor organizationally unique identifier (OUI) field that includes unique identification information of a vendor, and a vendor specific parameter field that includes at least one parameter information associated with a property of the vendor.

7. The method of claim 6, wherein the vendor specific parameter field includes at least one of a field that includes transmission coverage information associated with the signal transmission coverage and a field that includes ACK packet type information indicating a type of ACK packet transmitted from the plurality of devices for acknowledgement of data packets during reception of the data packets.

8. The method of claim 1, wherein the ACK packet type is determined by the signal transmission coverage.

9. The method of claim 1, further comprising controlling a transmission power used for transmission of the ACK packet and other packets in accordance with the transmission coverage info nation.

10. The method of claim 1, wherein the plurality of devices transmit and receive signals by using a superframe that includes a field to which a beacon is transmitted, at least one reserved channel time block field where data packets between a specific device and another device and ACK packet for acknowledgement of the data packets are transmitted and received in accordance with allocation of channel resources from the coordinator to the specific device, and at least one unreserved channel time block where the coordinator does not allocate channel resources to any device.

11. A receiving device of a wireless network, the device comprising:
a transmitting module for transmission of a wireless signal;
a receiving module receiving a beacon, which includes transmission coverage information associated with signal transmission coverage of the wireless network and ACK packet information indicating a type of an ACK packet transmitted from a plurality of devices for acknowledgement during reception of data packets, from a coordinator of the wireless network and receiving the data packets from a transmitting device of the wireless network; and
a control module transmitting an ACK packet according to an ACK packet type determined based on the ACK packet type information to the transmitting device through the transmitting module for acknowledgement of the data packets,
wherein at least one of the transmission coverage information and the ACK packet type information associated with configuration of the wireless network are input through a user interface of the coordinator of the wireless network.

12. The receiving device of claim 11, wherein the receiving module receives information of location where the wireless network is implemented in respect of the configuration of the wireless network from the coordinator through the beacon, the information of location being input through the user interface.

13. The receiving device of claim 11, wherein the transmission coverage information is determined by a user input for a maximum distance among distances between the plurality of devices belonging to the wireless network.

14. The receiving device of claim 11, wherein the ACK packet type is determined by a user input for a transmission direction of the ACK packet, and the ACK packet type is a directional ACK packet or an omni-directional ACK packet.

15. The receiving device of claim 11, wherein at least one of the transmission coverage information and the ACK packet type information is broadcasted through the beacon by being included in a vendor specific information element (IE), and a data format of the vendor specific IE includes an IE index field that includes index information indicating that an IE broadcasted by the coordinator is the vendor specific IE, a vendor organizationally unique identifier (OUI) field that includes unique identification information of a vendor, and a vendor specific parameter field that includes at least one parameter information associated with a property of the vendor.

16. The receiving device of claim 15, wherein the vendor specific parameter field includes at least one of a field that includes transmission coverage information associated with the signal transmission coverage and a field that includes ACK packet type information indicating a type of ACK packet transmitted from the plurality of devices for acknowledgement of data packets during reception of the data packets.

17. The receiving device of claim 11, wherein the ACK packet type is determined by the signal transmission coverage.

18. The receiving device of claim 11, wherein the control module controls a transmission power used for transmission of the ACK packet and other packets in accordance with the transmission coverage information.

* * * * *